(12) United States Patent
Boote et al.

(10) Patent No.: US 8,765,010 B2
(45) Date of Patent: *Jul. 1, 2014

(54) LIGNOCELLULOSIC FIBROUS COMPOSITES AND ASSOCIATED METHODS FOR PREPARING THE SAME

(75) Inventors: Carey J. Boote, Holland, MI (US); Russ Malek, Grand Rapids, MI (US)

(73) Assignee: Eco-Composites LLC, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/569,702

(22) Filed: Aug. 8, 2012

(65) Prior Publication Data

US 2013/0126781 A1 May 23, 2013

Related U.S. Application Data

(63) Continuation-in-part of application No. 13/427,511, filed on Mar. 22, 2012.

(60) Provisional application No. 61/466,301, filed on Mar. 22, 2011.

(51) Int. Cl.
*B01J 20/24* (2006.01)
*A01K 1/015* (2006.01)
*C09K 3/00* (2006.01)

(52) U.S. Cl.
USPC ............ 252/184; 252/194; 252/190; 435/277; 264/109; 119/28.5; 119/171

(58) Field of Classification Search
USPC ................ 252/184, 194, 190; 119/28.5, 171; 435/277; 264/109
See application file for complete search history.

(56) References Cited

U.S. PATENT DOCUMENTS

| | | | |
|---|---|---|---|
| 4,609,431 A | 9/1986 | Grose et al. | |
| 5,637,312 A * | 6/1997 | Tock et al. | 424/438 |
| 6,593,277 B2 | 7/2003 | Adamoli, Jr. et al. | |
| 6,742,478 B1 | 6/2004 | Davis | |
| 7,357,946 B2 | 4/2008 | Adamoli, Jr. et al. | |
| 7,708,214 B2 | 5/2010 | Medoff | |
| 7,727,355 B2 | 6/2010 | Goto et al. | |
| 7,905,987 B2 | 3/2011 | Kennedy | |
| 8,012,312 B2 | 9/2011 | Goto et al. | |
| 2008/0035036 A1* | 2/2008 | Bassani et al. | 110/224 |
| 2009/0036566 A1 | 2/2009 | Li et al. | |
| 2012/0285384 A1* | 11/2012 | Boote et al. | 119/28.5 |
| 2013/0126781 A1* | 5/2013 | Boote et al. | 252/184 |

* cited by examiner

*Primary Examiner* — Joseph D Anthony
(74) *Attorney, Agent, or Firm* — King & Partners, PLC

(57) ABSTRACT

A lignocellulosic fibrous composite having one or more solvents and a dried lignocellulosic fiber, wherein the dried lignocellulosic fiber has been processed by ruminant digestion and anaerobic digestion. A method for preparing a lignocellulosic fibrous composite is also disclosed including the steps of providing excrement from an animal which has undergone ruminant digestion, introducing the cow excrement into an anaerobic digester, modifying the cow excrement to a first wet product, and drying the first wet product to, in turn, generate a lignocellulosic fibrous composite.

17 Claims, 2 Drawing Sheets

LIGNOCELLULOSIC FIBROUS COMPOSITES AND ASSOCIATED METHODS FOR PREPARING THE SAME

CROSS-REFERENCE TO RELATED APPLICATIONS

This application is a continuation-in-part of U.S. application Ser. No. 13/427,511, filed Mar. 22, 2012, entitled "ANIMAL BEDDING AND ASSOCIATED METHOD FOR PREPARING THE SAME," which claims the benefit of U.S. Provisional Application Ser. No. 61/466,301, filed Mar. 22, 2011, entitled "FIBROUS MATERIALS AND ASSOCIATED METHODS FOR USING THE SAME," which are hereby incorporated herein by reference in their entirety—including all references and appendices cited therein.

BACKGROUND OF THE INVENTION

1. Field of the Invention

The present invention relates in general to lignocellulosic fibrous composites and, more particularly, to lignocellulosic fibrous composites which comprise dried lignocellulosic fibers that have been processed by ruminant digestion and anaerobic digestion. The lignocellulosic fibrous composites and associated methods of the present invention are environmentally beneficial because they convert waste to resources, reduce air and water pollution, and directly contribute to the procurement of sustainable biological systems.

Composites and biomass have been known in the art for centuries and are the subject of a plurality of patents and publications including but not limited to: U.S. Pat. No. 4,609,431 entitled "Non-Woven Fibrous Composite Materials and Method for the Preparation Thereof," U.S. Pat. No. 6,593,277 entitled "Uses For Cellulose-Containing Aggregates," U.S. Pat. No. 6,742,478 entitled "Absorbent Animal Bedding Material and Method of Manufacturing and Using Same," U.S. Pat. No. 7,357,946 entitled "Uses for Cellulose-Containing Aggregates," U.S. Pat. No. 7,708,214 entitled "Fibrous Materials and Composites," U.S. Pat. No. 7,727,355 entitled "Methods For Producing Recycled Pulp and Methods for Modifying Pulp Fiber Surfaces Using Liquid Jet Cavitation," U.S. Pat. No. 7,905,987 entitled "Paper Sludge Processing for Animal Bedding," U.S. Pat. No. 8,012,312 entitled "Cellulose-Based Fibrous Materials," and United States Patent Application Publication No. 2009/0036566 entitled "Biodegradable Composite, Product Made Therefrom, and Method of Manufacture Thereof," all of which are hereby incorporated herein by reference in their entirety—including all references cited therein.

U.S. Pat. No. 4,609,431 appears to disclose non-woven, fibrous composite materials in sheet form which are particularly useful as dimensionally stable backings and interliners for surface covering laminates. A method of producing these sheets and laminates is also disclosed.

U.S. Pat. No. 6,593,277 appears to disclose aggregates of cellulose-containing particles, such as particles of waste paper and optional other vegetation or waste particles which are used as a carrier for additives such as insecticides, herbicides, fertilizers and nutrients. The particles permit a timed release of the additives. The particles can be employed as a building insulation to prevent infestations of roaches, termites, ant, or other insects in the building when they contain insecticides. The particles can also be employed to promote revegetation of denuded areas, such as highway right of ways when they contain fertilizers and nutrients.

U.S. Pat. No. 6,742,478 appears to disclose an animal bedding material that includes a layer of substantially dry ground drywall and a layer of a substantially absorbent litter material. The ground drywall layer has a concentration of greater than $10 \text{ g/ft}^2$ and includes ground gypsum and ground paper backing. The ground drywall constituent of the bedding material helps control odor, acts as a moisture barrier, and provides a lift to the waste saturated litter material, which reduces compaction and extends the useful life of the bedding material.

U.S. Pat. No. 7,357,946 appears to disclose aggregates of cellulose-containing particles, such as particles of waste paper and optional other vegetation or waste particles which are used as a carrier for additives such as insecticides, herbicides, fertilizers and nutrients. The particles can be also used as a carrier for insect repellants, preferably naturally occurring insect repellants, to repel insects from rooms, buildings, plants, and outdoor areas, and to carry adhered seeds onto an area to be planted with seeds.

U.S. Pat. No. 7,708,214 appears to disclose fibrous materials, compositions that include fibrous materials, and uses of the fibrous materials and compositions. For example, the fibrous materials are associated with a microorganism to produce ethanol or a by-product, such as a protein or lignin.

U.S. Pat. No. 7,727,355 appears to disclose recycled pulp with little damage to fibers, high brightness and low residual ink by means of a force selectively acting on fiber surfaces during the process of recycling waste paper. Moreover, fiber surfaces are modified by means of a force acting on only the fiber surfaces to obtain high-quality pulp and to render harmless dirts deteriorating pulp quality. A method for producing recycled pulp characterized in that cavitation is generated and used to strip contaminants deposited on fibers and ash during the process of recycling waste paper. Contaminants such as ink deposited on fibers and ash are stripped/fragmented by means of the impact force induced by collapse of fine bubbles by actively introducing bubbles generated by cavitation into a pulp suspension.

U.S. Pat. No. 7,905,987 appears to disclose a method for making an animal bedding fiber product, the method includes providing fiber from paper sludge, formulating the fiber in a mixture including a first desiccant agent including ash, so as to form a friable aggregate. Further, a fiber product including at least one short paper fiber from a secondary fiber, one or more inorganic fillers including kaolin clay, and a first desiccant agent including ash. Further still, a heatless process for making a fiber product including providing fiber from paper sludge, formulating the fiber in a non-active heat generating mixture including a first desiccant agent including ash, so as to form a waste fiber product.

U.S. Pat. No. 8,012,312 appears to disclose cellulose-based fibrous materials for obtaining papers and sheets having low density, high surface quality, good size stability despite of high strength, and high opacity. Cellulose-based fibrous materials having external fibrils consisting of an assembly of scale-like microfibrils exhibit a higher fiber stiffness, a lower water retention value and a higher specific surface area as compared with fibrous materials having filamentous external fibrils at the same freeness. Papers and sheets having low density, high surface quality, good size stability and high opacity can be obtained by using such fibrous materials.

United States Patent Application Publication No. 2009/0036566 appears to be directed to biodegradable composites and products, and methods of their manufacture. The composites typically comprise 10% by weight to 80% by weight of a material derived from an agricultural residue or are obtained from a natural source, 20% by weight to 80% by weight of a polymer binder, 5% by weight to 20% by weight of a compatibilizer, and an effective amount of a processing aid.

While composites and biomass products of various forms and methods have been known in the art for years, issues associated with durability, absorbency, waste, compostability, biodegradability, as well as facilitating sustainable biological systems remain largely problematic.

Therefore, it is an object of the present invention to provide lignocellulosic fibrous composites for a plurality of applications which have been processed by rudiment digestion and anaerobic digestion. Such biomass composites convert waste to resources, reduces air and water pollution, and directly contributes to the procurement of sustainable biological systems.

These and other objects of the present invention will become apparent in light of the present specification, claims, and drawings.

SUMMARY OF THE INVENTION

In one embodiment, the present invention is directed to lignocellulosic fibrous composite, comprising, consisting and/or consisting essentially of: (a) one or more solvents; and (b) a dried lignocellulosic fiber, wherein the dried lignocellulosic fiber has been processed by ruminant digestion and anaerobic digestion.

In a preferred embodiment of the present invention, the one or more solvents comprise water which is preferably present in a concentration of less than approximately 70% by weight.

In another preferred embodiment of the present invention, the one or more solvents are present in a concentration of less than approximately 50% by weight, and more preferably less than approximately 25% by weight.

In yet another preferred embodiment of the present invention, the dried lignocellulosic fiber compromises processed lignin, hemicellulose, and/or cellulose.

In a preferred embodiment of the present invention, the dried lignocellulosic fiber is present in a concentration of greater than approximately 40% by weight, and more preferably greater than approximately 50% by weight.

In one aspect of the present invention, the density of the lignocellulosic fibrous composite ranges from approximately 5 pounds per cubic foot to approximately 19 pounds per cubic foot, and more preferably ranges from approximately 5 pounds per cubic foot to approximately 10 pounds per cubic foot.

In another preferred embodiment of the present invention, the lignocellulosic fibrous composite is free flowing, non-pelletized, and comprises an average particle size of less than approximately 10 microns.

In yet another preferred embodiment of the present invention, the lignocellulosic fibrous composite further comprises an odor suppressant, such as an organic ester.

Moreover, the lignocellulosic fibrous composite may further comprise an indictor to inform a user when the lignocellulosic fibrous composite has been soiled with urine. Non-limiting examples of indicators include 3-amino-7-dimethylamino-2-methylphenazine hydrochloride and 3,3-bis(4-hydroxy-2-methyl-5-propan-2-ylphenyl)-2-benzofuran-1-one.

The present invention is also directed to a method for preparing a lignocellulosic fibrous composite, comprising the steps of: (a) providing excrement from an animal which has undergone ruminant digestion; (b) introducing the excrement into an anaerobic digester; (c) modifying the excrement to a first wet product; and (d) drying the first wet product to, in turn, generate a lignocellulosic fibrous composite.

In a preferred embodiment of the present invention, the above-identified method further comprises the step of bleaching the lignocellulosic fibrous composite. It will be understood that regardless of its ordinary meaning, the term "bleaching" will be defined herein as chemical bleaching, color alternating, color lightening, and/or physical separation of colored material.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 2 of the drawings is a perspective view of a lignocellulosic fibrous composite manufactured in accordance with the present invention.

DETAILED DESCRIPTION OF THE INVENTION

Figure 1:
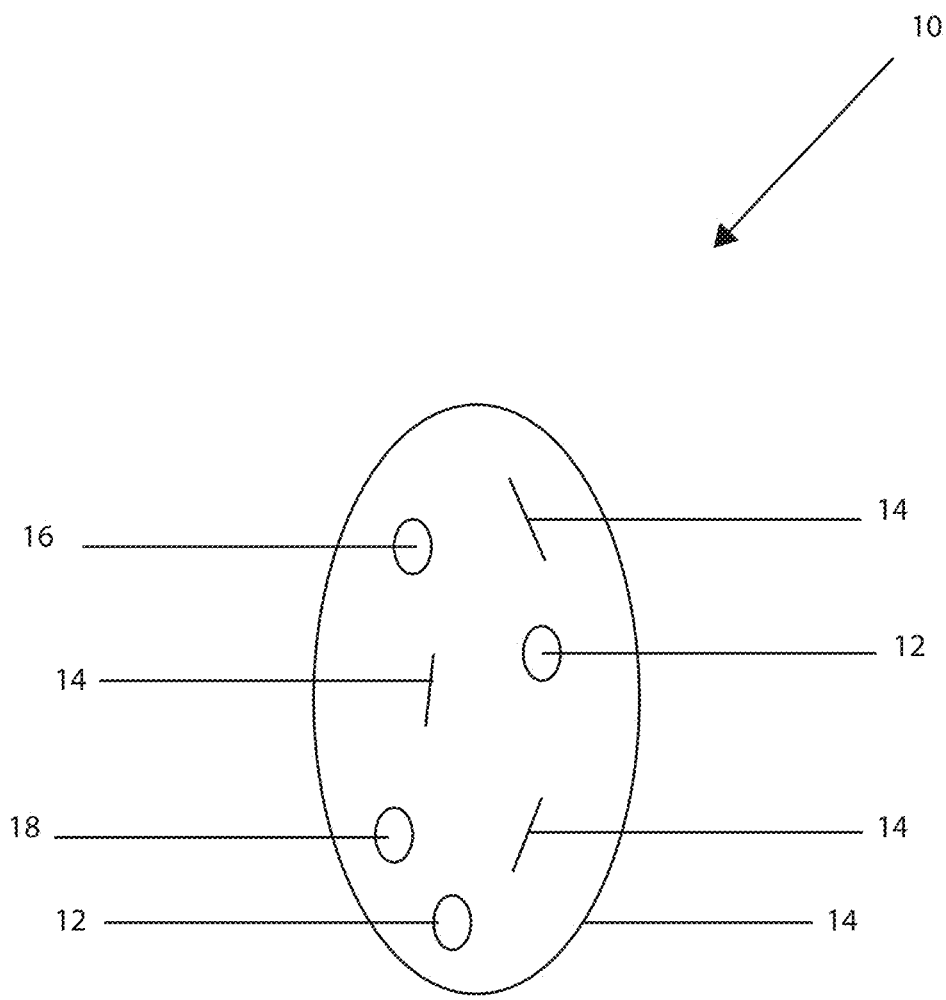
FIG. 1 of the drawings is a cross-sectional view of a dried lignocellulosic fiber manufactured in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters. It will be further understood that one or more of FIGS. 1-2 are merely schematic representations of lignocellulosic fibrous composites. As such, some of the components have been distorted from their actual scale for pictorial clarity.

In accordance with the present invention, the lignocellulosic fibrous composites disclosed herein are configured for use in a plurality of applications including, but not limited to, dairy bedding, horse bedding, cat bedding, small animal bedding, filler material, fertilizer and/or fertilizer base material, biocompatible absorbent, etcetera. The lignocellulosic fibrous composites of the present invention, among other benefits, have substantially longer stall life (i.e., utilization time), reduce store, farm and/or stall management costs, reduce cleaning costs, reduce material disposal costs, reduce veterinary costs, relative to commercially available composites. Moreover, the lignocellulosic fibrous composites of the present invention are a direct result of the conversion of waste material to a resource which is biodegradable, compostable, and sustainable with respect to biological systems.

Referring now to the drawings and to FIG. 1 in particular, a cross-sectional view of lignocellulosic fibrous composite 10 is shown which generally comprises one or more solvents 12 and at least partially dried lignocellulosic fiber 14. It will be understood that lignocellulosic fiber 14 has been processed by both ruminant digestion and supplemental anaerobic digestion. In particular, the ruminant digestion typically occurs in a cow or other animal and the supplemental anaerobic digestion occurs in an anaerobic digester which is commercially available from any one of a number or sources, including Fair Oaks Dairy, Fair Oaks, Ind. and Scenic View Dairy, Fennville, Mich. It will be understood that sequential ruminant digestion followed by anaerobic digestion chemically and physically alters the original animal excrement into a material having different physical and chemical properties.

One or more solvents 12 of lignocellulosic fibrous composite 10 preferably comprise water, but other solvents are likewise contemplated for use in accordance with the present invention, including non-polar solvents (e.g., pentane, hexane, benzene, toluene, chloroform, diethyl ether, etcetera) polar aprotic solvents (e.g., acetone, propylene carbonate, tetrahydrofuran, etcetera) and/or polar protic solvents (e.g., water, methanol, ethanol, isopropanol, acetic acid, formic acid, etcetera). Preferably, the concentration of one or more solvents 12 is less than approximately 70% by weight, and more preferably less than approximately 50% by weight, and yet more preferably less than approximately 25% weight. It will be understood that one or more solvents 12 of lignocellulosic fibrous composite 10 are entrapped into the structure of dried lignocellulosic fiber 14, which among other things, provides for a sponge-like characteristic, as well as facilitates the initiation of cellular absorption. It will be further understood that one or more solvents 12 of lignocellulosic fibrous composite 10 facilitates attractive forces, including, but not limited to, Van der Waals forces and/or hydrogen bonding between atoms, molecules, and/or surfaces of lignocellulosic fiber 14—including lignin, hemicellulose, and/or cellulose and fibers of the same—just to name a few.

In one embodiment, lignocellulosic fiber 14 includes a combination of lignin, hemicellulose, and/or cellulose. However, as will be discussed in greater detail below, lignocellulosic fiber 14 may comprise other materials. After being processed by ruminant digestion, supplemental anaerobic digestion, and drying beyond ambient conditions, the density of lignocellulosic fibrous composite 10 preferably ranges from approximately 5 pounds per cubic foot to approximately 19 pounds per cubic foot, and more preferably from approximately 5 pounds per cubic foot to approximately 10 pounds per cubic foot. Additionally, lignocellulosic fiber 14 of lignocellulosic fibrous composite 10 is present in a concentration of greater than approximately 40% by weight, and more preferably present in a concentration of greater than approximately 50% by weight.

In one preferred embodiment of the present invention, lignocellulosic fibrous composite 10 preferably comprises an alkaline pH which ranges from greater than approximately 8 to less than approximately 10.5. However, it will be understood that non-alkaline pH's are contemplated for certain applications.

In another preferred embodiment of the present invention, lignocellulosic fibrous composite 10 includes lignocellulosic fiber 14 which preferably comprises an average particle size of less than approximately 10 microns.

As is best shown in FIG. 2, in one embodiment of the present invention, lignocellulosic fibrous composite 10 is free flowing and non-pelletized.

Lignocellulosic fibrous composite 10 may also include odor suppressant 16. Odor suppressant 16 preferably comprises an organic ester to mask urine and/or feces odor, and may also comprise an odor neutralizer which converts urea to a less odoriferous compound.

In accordance with the present invention, lignocellulosic fibrous composite 10 may also include indicator 18 which visually identifies when lignocellulosic fibrous composite 10 has been soiled by an animal. Non-limiting examples of indicators 18 include 3-amino-7-dimethylamino-2-methylphenazine hydrochloride and 3,3-bis(4-hydroxy-2-methyl-5-propan-2-ylphenyl)-2-benzofuran-1-one—just to name a few.

The present invention is also directed to a method for preparing a lignocellulosic fibrous composite, comprising the following steps. First, a ruminant animal (e.g., cow, cattle, goat, sheep, giraffe, bison, moose, elk, yak, water buffalo, deer, camel, alpaca, llama, antelope, pronghorn, nilgai, etcetera) is fed with sufficient quantities of bast and/or bast type fiber from one or more sources including, but not limited to, corn, wheat, alfalfa, etcetera. Second, excrement from the ruminant animal which has undergone ruminant digestion via the animal is obtained. Next, the animal excrement is associated with (e.g., placed in) an anaerobic digester which generates a first wet product. After the first wet product is generated, it is placed into a dryer which generates a first dry product (i.e., beyond ambient conditions). The first dry product is suitable for use as lignocellulosic fibrous composite 10, but may also be densified and/or pelletized using conventional techniques (e.g., compression densification and/or pelletization). One commercial source for pelletization is Michigan Wood Fuel Pellets, Holland, Mich. Lastly, the first wet product and/or the first dry product may be bleached or color altered prior to, during, and/or after densifying the first dry product.

The invention is further described by the following example.

EXAMPLE I

Perfect Cycle™ Natural Composite, which is commercially available from Eco-composites LLC, Holland, Mich., was placed into a horse stall. On the same day traditional wood shaving bedding was placed into a separate horse stall. After approximately three days of use, the traditional wood shaving bedding was saturated to the point where the horse was showing signs of dissatisfaction with the bedding. However, the Perfect Cycle™ Natural Composite of the present invention, was still acceptably absorbent after fifteen days and substantial breakdown was not observed until after about 21 days. The Perfect Cycle™ Natural Composite exhibited a plurality of superior features/characteristics including five times the absorbency and product life compared to traditional wood shaving bedding. Moreover, the odor emanating from the stall with the Perfect Cycle™ Natural Composite was substantially more acceptable compared to the odor emanating from the stall with the traditional wood shaving bedding. Furthermore, due to, at least in part, the solvent configuration, composition and/or concentration of the Perfect Cycle™ Natural Composite, the dust observed in the horse stall was substantially reduced compared to the dust observed in the stall with the traditional wood shaving bedding. Lastly, after use, the Perfect Cycle™ Natural Composite was readily compostable, whereas the traditional wood shaving bedding were required to be disposed of using traditional resources.

The foregoing description merely explains and illustrates the invention and the invention is not limited thereto except insofar as the appended claims are so limited, as those skilled in the art who have the disclosure before them will be able to make modifications without departing the scope of the invention.

What is claimed and desired to be secured by Letters Patent of the United States is:

1. A lignocellulosic fibrous composite, comprising:
    at least one solvent; and
    a dried lignocellulosic fiber, wherein the dried lignocellulosic fiber has been processed by ruminant digestion and anaerobic digestion, and wherein the average particle size of the dried lignocellulosic fiber is less than approximately 10 microns and further wherein the density of the lignocellulosic fibrous composite ranges from approximately 5 pounds per cubic foot to approximately 19 pounds per cubic foot.

2. The lignocellulosic fibrous composite according to claim 1, wherein the at least one solvent comprises water.

3. The lignocellulosic fibrous composite according to claim 1, wherein the at least one solvent is present in a concentration of less than approximately 70% by weight.

4. The lignocellulosic fibrous composite according to claim 1, wherein the at least one solvent is present in a concentration of less than approximately 50% by weight.

5. The lignocellulosic fibrous composite according to claim 1, wherein the at least one solvent is present in a concentration of less than approximately 25% by weight.

6. The lignocellulosic fibrous composite according to claim 1, wherein the dried lignocellulosic fiber compromises processed lignin, hemicellulose, and cellulose.

7. The lignocellulosic fibrous composite according to claim 1, wherein the density of the lignocellulosic fibrous composite ranges from approximately 5 pounds per cubic foot to approximately 10 pounds per cubic foot.

8. The lignocellulosic fibrous composite according to claim 1, wherein the lignocellulosic fibrous composite is free flowing and non-pelletized.

9. The lignocellulosic fibrous composite according to claim 1, further comprising an odor suppressant.

10. The lignocellulosic fibrous composite according to claim 9, wherein the odor suppressant comprises an organic ester.

11. The lignocellulosic fibrous composite according to claim 1, further comprising 3-amino-7-dimethylamino-2-methylphenazine hydrochloride.

12. The lignocellulosic fibrous composite according to claim 1, further comprising 3,3-bis(4-hydroxy-2-methyl-5-propan-2-ylphenyl)-2-benzofuran-1-one.

13. The lignocellulosic fibrous composite according to claim 1, wherein the dried lignocellulosic fiber is present in a concentration of greater than approximately 40% by weight.

14. The lignocellulosic fibrous composite according to claim 1, wherein the dried lignocellulosic fiber is present in a concentration of greater than approximately 50% by weight.

15. A lignocellulosic fibrous composite derived from cow excrement, comprising:

a composite comprising a solvent and a dried lignocellulosic fiber, wherein the solvent comprises water and the dried lignocellulosic fiber compromises processed lignin, hemicellulose, and cellulose, and wherein the dried lignocellulosic fiber has been processed by ruminant cow digestion and anaerobic digestion; wherein the water is present in a concentration of less than approximately 25% by weight; wherein the average particle size of the dried lignocellulosic fiber is less than approximately 10 microns; and wherein the density of the dried lignocellulosic fibrous composite ranges from approximately 5 pounds per cubic foot to approximately 19 pounds per cubic foot; and wherein the pH of the dried lignocellulosic fiber ranges from greater than approximately 8 to less than approximately 10.5.

16. A method for preparing a lignocellulosic fibrous composite, comprising the steps of:

providing excrement from an animal which has undergone ruminant digestion;

introducing the excrement into an anaerobic digester;

modifying the excrement to a first wet product; and drying the first wet product to, in turn, generate a lignocellulosic fibrous composite; wherein the average particle size of the dried lignocellulosic fiber is less than approximately 10 microns and further wherein the density of the lignocellulosic fibrous composite ranges from approximately 5 pounds per cubic foot to approximately 19 pounds per cubic foot.

17. The method according to claim 16, further comprising the step of bleaching the dried lignocellulosic fibrous composite.

* * * * *